Figure 1:
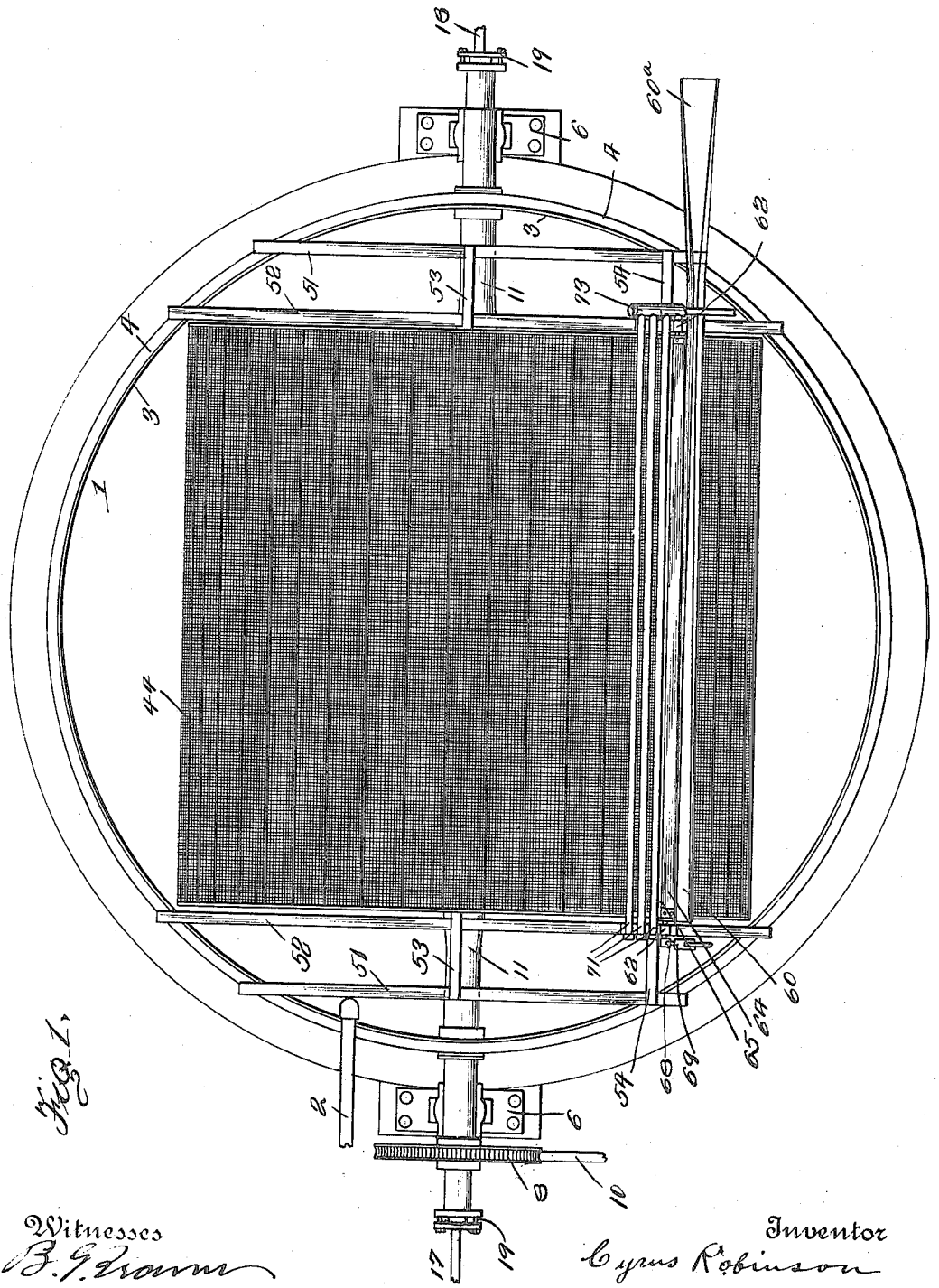

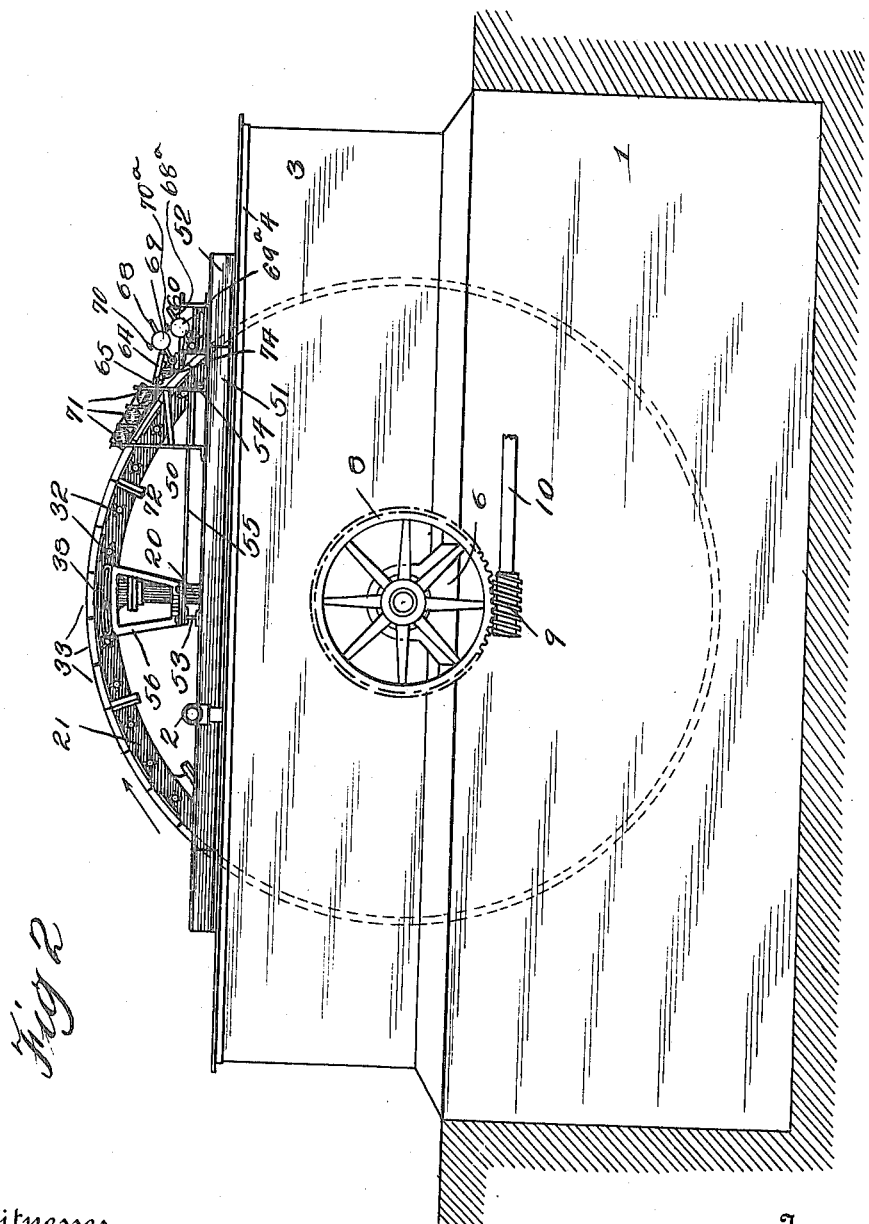

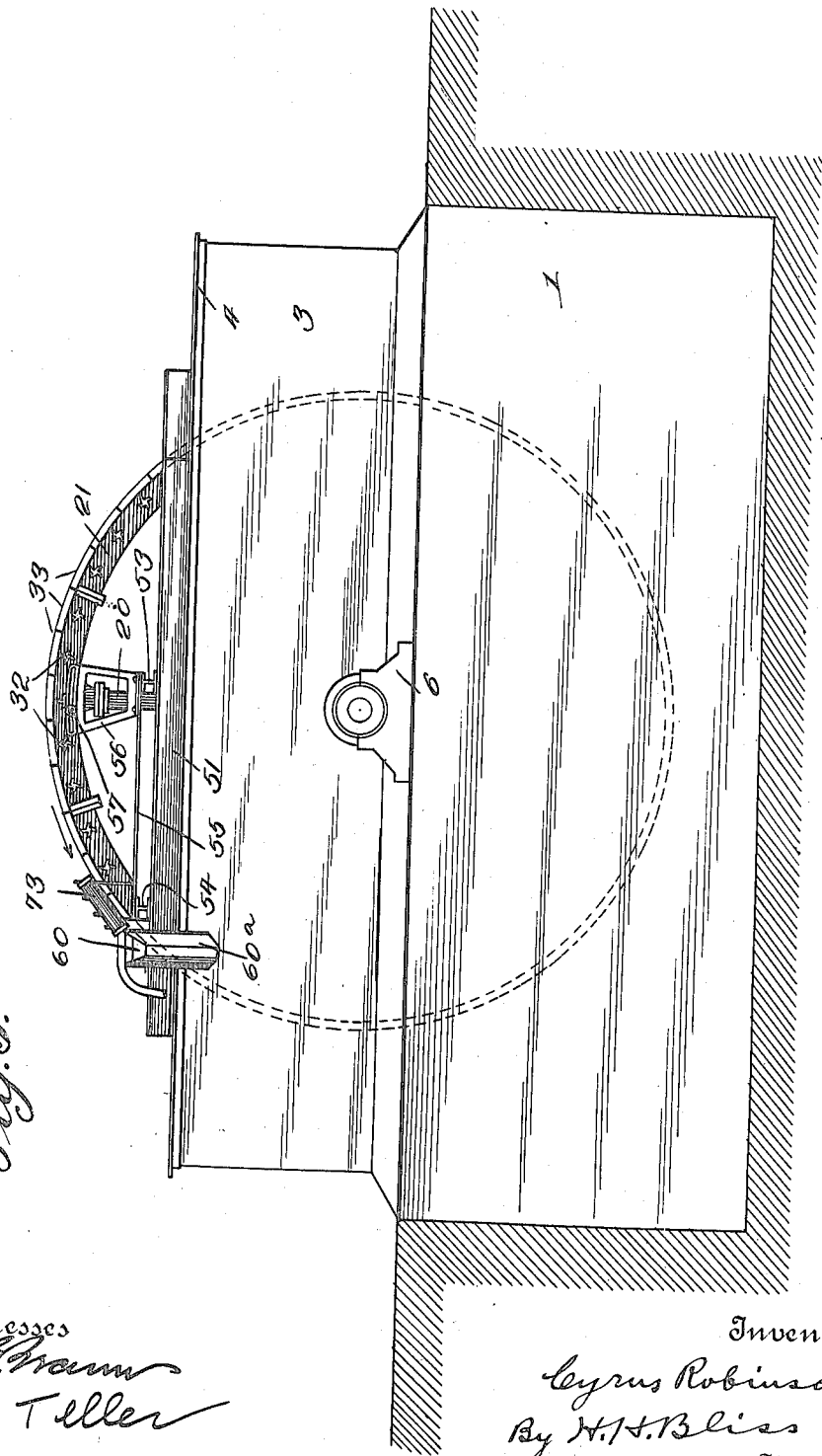

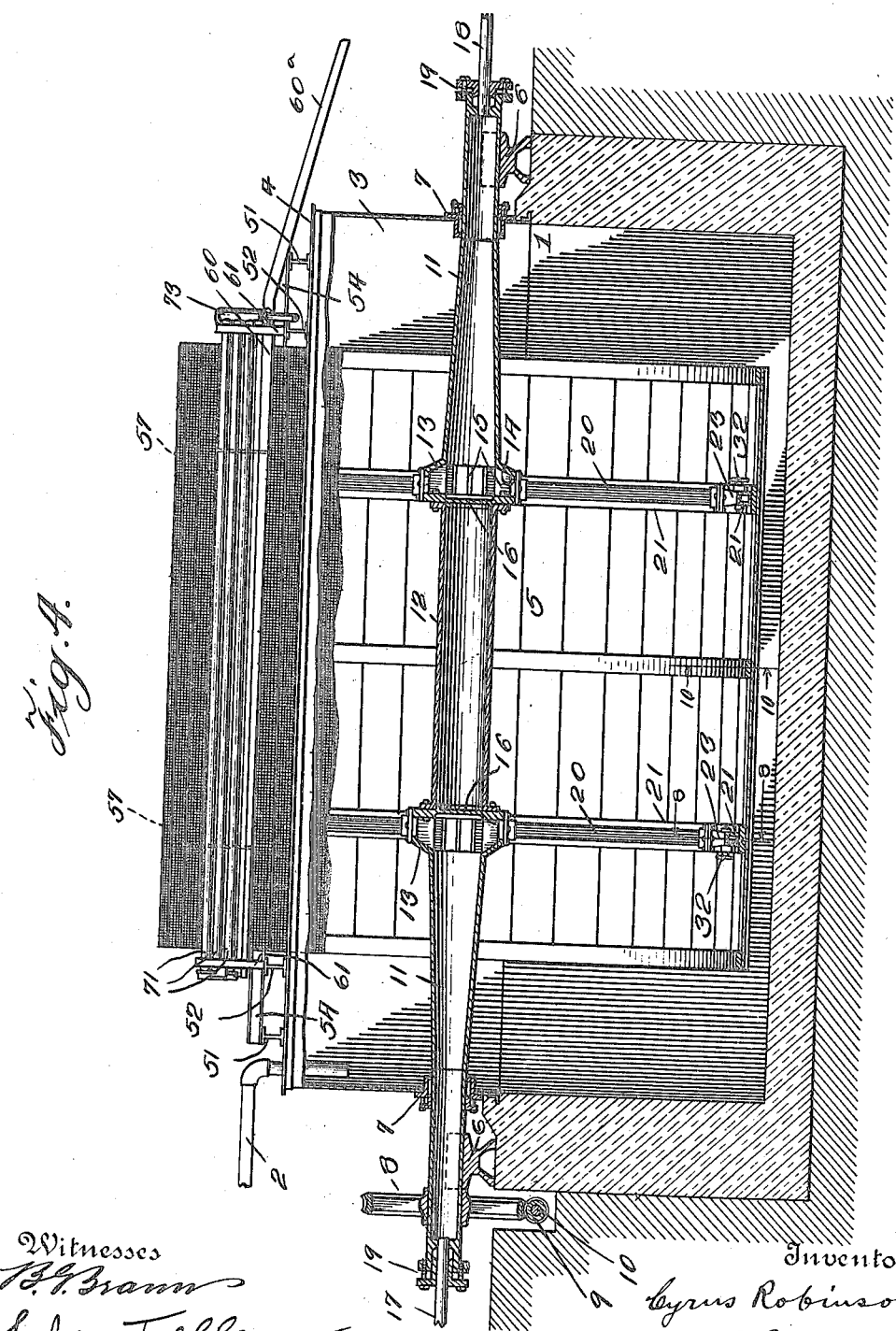

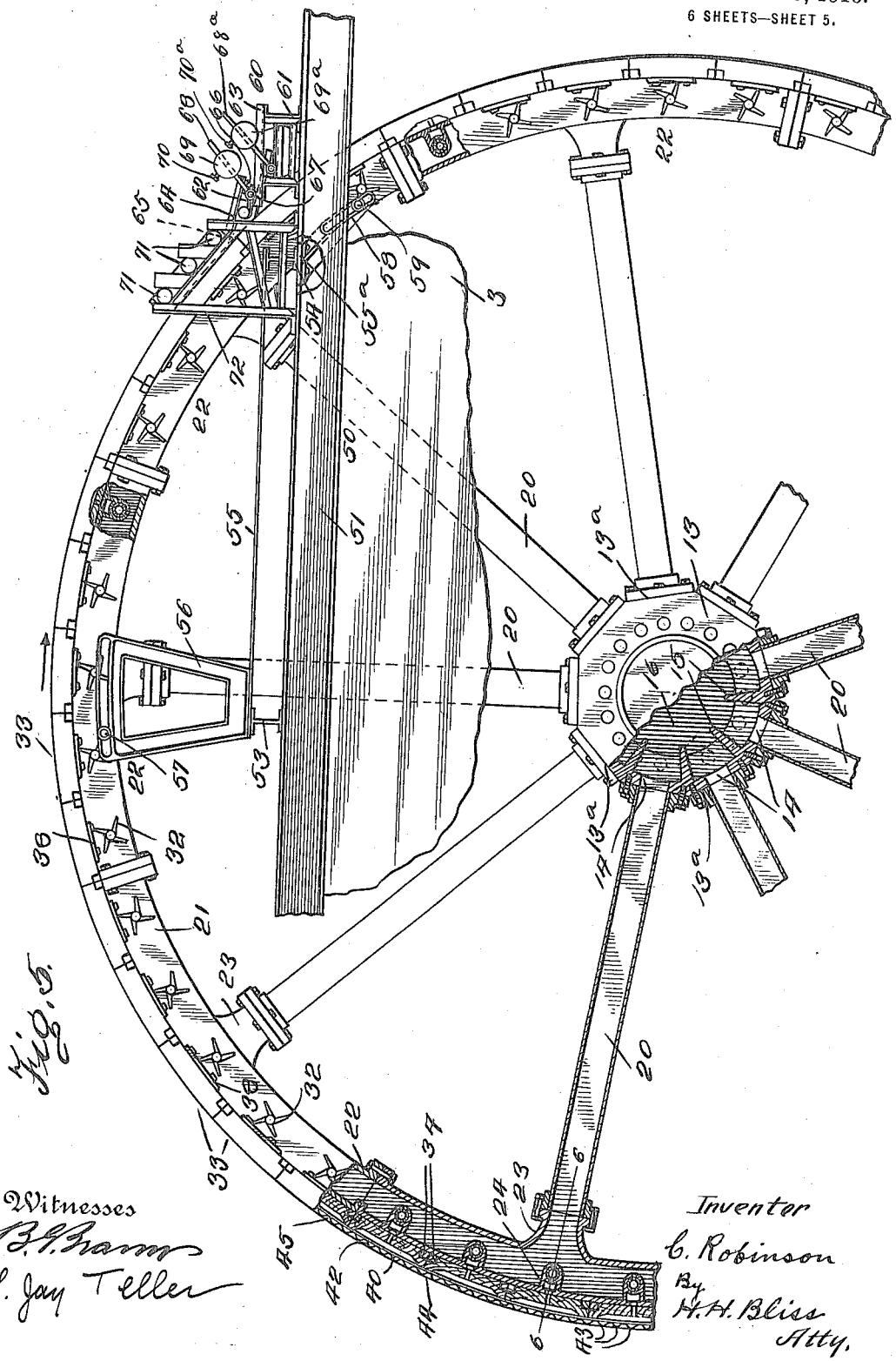

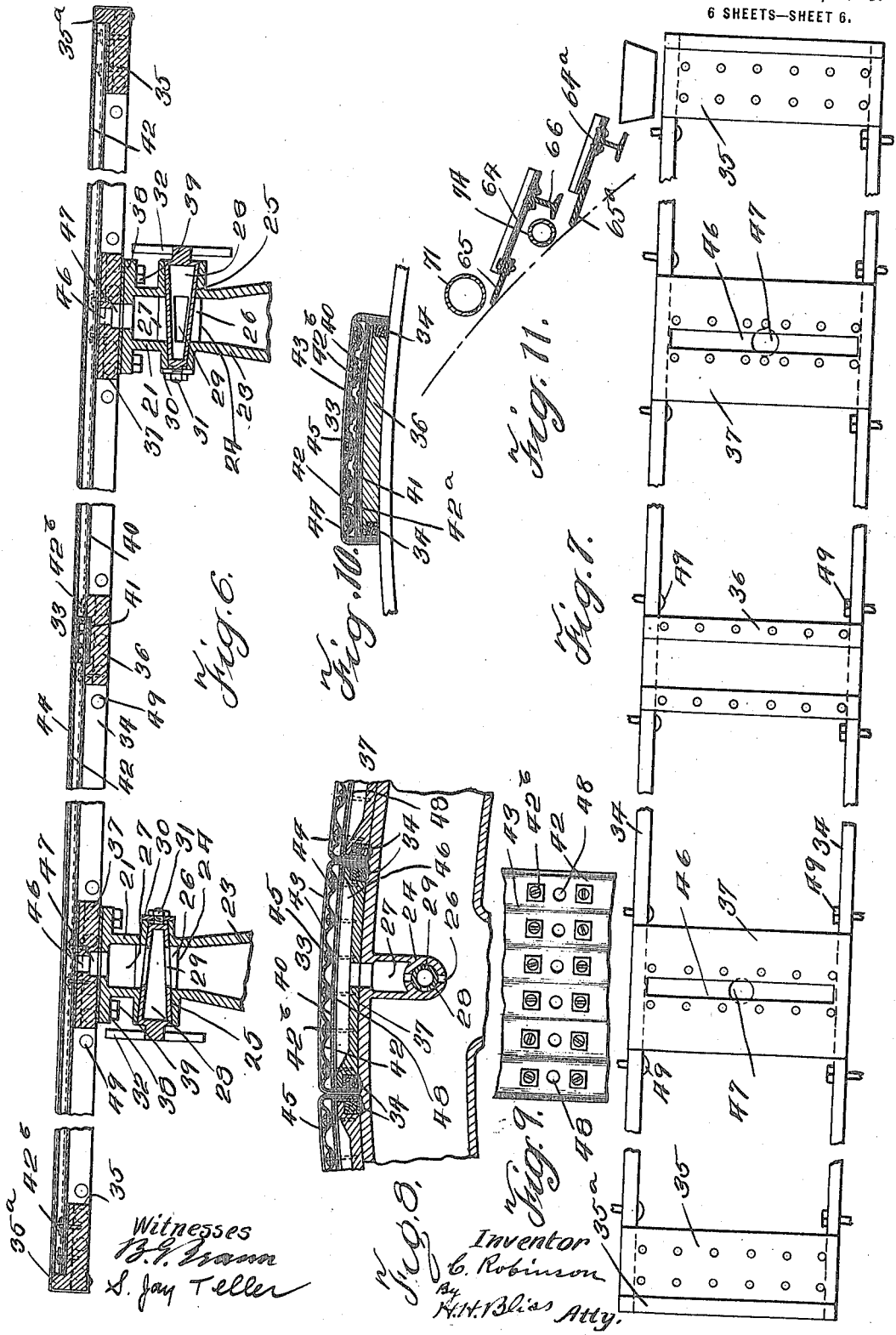

UNITED STATES PATENT OFFICE.

CYRUS ROBINSON, OF MOUNT VERNON, NEW YORK, ASSIGNOR TO METALLURGICAL ENGINEERING & PROCESS CORPORATION, A CORPORATION OF NEW YORK.

DEHYDRATER.

1,208,014.         Specification of Letters Patent.     Patented Dec. 12, 1916.

Application filed November 29, 1910. Serial No. 594,704.

*To all whom it may concern:*

Be it known that I, CYRUS ROBINSON, a subject of the King of Great Britain and Ireland, residing at Mount Vernon, in the county of Westchester and State of New York, have invented certain new and useful Improvements in Dehydraters, of which the following is a specification, reference being had therein to the accompanying drawings.

This invention relates to improvements in filtering or dehydrating machines and is especially adapted for use in separating the moisture from ore pulp during processes of extracting the metallic values from ore by means of chemicals such as potassium cyanid.

The invention relates more particularly to that class of machines in which a rotating drum or equivalent structure is used for supporting a filtering medium, and in which the filtering medium when so supported is alternately subjected to the action of suction and of air pressure.

The objects of my invention are to provide a machine of this general character having various improved structural features, improved means for controlling the vacuum and air pressure, and improved means for removing the filtered material from the surface of the filtering medium.

Further objects will appear from the following specification.

In the accompanying drawings I have shown the form of my invention which I at present deem preferable, but many changes and modifications within the scope of my invention will be apparent to those skilled in the art.

Of the drawings, Figure 1, is a plan view of a mechanism embodying my invention. Fig. 2, is a view showing one end. Fig. 3, is a view showing the other end. Fig. 4, is a side view partly in elevation and partly in longitudinal section along the central plane of the machine. Fig. 5 is an enlarged end elevation of the rotating drum with certain adjacent parts, portions of the drum being shown in cross section. Fig. 6 is an enlarged fragmentary cross sectional view taken along the line 6—6 of Fig. 5. Fig. 7 is a plan view of the wooden parts of one of the filtering sections. Fig. 8 is an enlarged fragmentary cross sectional view showing part of the frame work and adjacent parts for supporting the filtering medium taken along the line 8—8 of Fig. 4. Fig. 9 is a fragmentary plan view of a portion of the canvas support with the canvas removed. Fig. 10 is a cross sectional view taken along the line 9—9 of Fig. 4. Fig. 11 is a cross sectional view of the scraper for removing material from the drum, and also of adjacent parts.

Referring to the drawings, 1 represents as a whole a vat or tank for receiving and holding the solution or pulp which is to be dehydrated. The solution or pulp to be treated may be led into the tank by any suitable means such as a pipe 2.

The lower part of the tank may advantageously be constructed of concrete as indicated in the drawings and the upper part may advantageously be formed of sheet metal 3 reinforced at the top with an angle iron 4. The tank is shown cylindrical in form though it will be understood that this particular shape is not essential.

5 represents as a whole a hollow shaft which extends horizontally through the center of the upper part of the tank 1. The shaft is mounted in bearings 6, 6, which may, if desired, be arranged to engage with it only at the lower side as indicated in the drawings. Stuffing boxes 7, 7, are provided to prevent leakage of the solution or pulp at the points where the shaft extends through the tank walls.

A suitable mechanism is provided for rotating the shaft and the parts attached to it, which will be fully described hereinafter. This rotating mechanism for the shaft may conveniently be a worm wheel 8 and a worm 9 mounted upon a shaft 10 which is operatively connected to any desired source of power.

The shaft 5 is preferably made in three sections, the end sections 11, 11, being necessarily hollow and the central section 12 being also preferably hollow to reduce the weight. Each of the tubular end shaft sections is preferably tapered toward its outer end. The inner end is provided with an enlargement or hub 13 having its periphery composed of a number of small flat faces 13$^a$, 13$^a$, nine such faces being shown in the drawing. A circular aperture 14 is provided in each of the faces near its center, the aperture communicating with the hollow interior of the hub. Small radial ribs or partitions 15, 15, are provided one between each two adjacent apertures.

The inner end of each of the sections 11, 11, is closed by a wall 16. The flanged central section 12 is secured to the end sections preferably by means of bolts as indicated. At the outer ends of the hollow end sections 11, 11, are stationary pipes 17 and 18. Stuffing boxes 19, 19, are used to insure proper communication of the pipes with the interiors of the shaft sections without leakage. One of the pipes, as for instance 17, is connected to a suitable device for producing a partial vacuum, and the other pipe, as for instance 18, is connected with a suitable device for supplying air or other gas under pressure. The purposes of these suction and air supply pipes will be later fully set forth.

A number of hollow spokes 20, 20, are provided. In the drawings nine such spokes are indicated as connected with each of the hollow hubs 13, the inner end of each spoke being fastened to one of the faces 13ª of the hub, with the passage through the spoke in register with the corresponding aperture 14. These spokes may advantageously be formed of sections of piping to the ends of which are secured flanges of standard form.

At the outer ends of the spokes of each set there is secured an annular, tubular ring or combined conduit and frame 21. This is preferably formed of cast iron in sections 22, 22, as many sections being provided as there are spokes. The ends of the adjacent sections may be provided with flanges through which pass bolts for connecting the sections together. Each section is provided with a hollow flanged boss 23, which is connected with the outer end of a spoke and which serves to establish communication between the interior of the spoke and the interior of the section. It will be noted that the sections connect with each other and thus free and uninterrupted communication is provided not only between all parts of the conduit or frame 21, but also, through the spokes 20, between the conduit and the interior of the corresponding shaft section 11.

Each of the conduit or frame sections 22 is provided with a number of radially inward projecting bosses 24, 24. In the drawings five such bosses are shown for each section. As the constructions of all of these bosses and of the parts connected therewith are similar, a detail description of one of them will be sufficient.

Referring more particularly to Figs. 6 and 8, it will be observed that a tapering aperture 25 is provided which extends transversely of the conduit section through the boss 24. Passage-ways 26 and 27 are provided through each boss to the aperture 25, one of these passageways 26 communicating with the interior of the conduit and the other passageways 27 with the exterior at the periphery. Rotatably mounted within the aperture 25 is a correspondingly tapered valve plug or spigot 28, having a diametrical passage 29. It will be noted that the passageways 26 and 27 form ducts which extend radially outward from the conduit to the filter sections. These ducts are opened and closed by the valves. The spigot may be held in place by a washer 30 and a nut 31, engaging its threaded end. The other end of the spigot is provided with a star wheel 32 having four arms. The purpose and function of the star wheel will be hereinafter fully set forth.

33 represents as a whole one of the filtering sections or pans which are secured to the frames 21, 21, and which, taken together, form a continuous drum or cylinder. As many of these sections are provided as there are bosses 24 and spigots 28, in this case there being forty-five sections in all. As these filtering sections or pans are of similar construction, a particular description of one of them will be sufficient.

As a framework for each filter section there are provided two parallel bars 34, 34, which extend the full length of the drum. They are preferably made of wood. Cross bars or blocks, 35, 35, extend between the bars at their ends and a similar cross bar or block 36 extends between them at their centers. Each of the blocks 35, 35, and 36, is of the same thickness as the bars 34, 34, and is notched to receive the correspondingly notched bars, as is shown in Figs. 6 to 8. Outstanding flanges 35ª, 35ª, are provided at the outer edges of the blocks 35, 35. Blocks 37, 37, similar to the block 36 also extend between the bars 34 and 34, and are positioned to be detachably secured to the conduits or frames 21, 21, by means of flanges 38, 38, and bolts 39, 39. All of the blocks 35, 36 and 37, are preferably formed of some hard wood such as lignum vitæ.

The frame work which has been described is covered between the flanges 35ª, 35ª, with a rolled metal sheet 40, which may for the sake of convenience be made in two parts connected by a butt strap 41, as shown in Fig. 10. The edges of the sheet 40 are bent inward to engage the edges of the bars 34 and the cross blocks. Outside of the sheet 40 is a second sheet of metal 42 which is given a series of longitudinal corrugations 43, 43, and which is also bent inward to contact with the inward bent edges of the sheet 40. The sheet 42 may also be in two parts connected by a butt strap 42ª. The sheets 40 and 42 may be secured in place by means of screws 42ᵇ at the bottoms of the corrugations and which extend into the blocks. If desired their inward bent edges may be riveted together.

44 represents a sheet of canvas which is stretched over the corrugations 43 and the edges of which are carried downward and inward and secured by nails or tacks to the bottoms of the bars 34, 34. It will be observed that by means of this construction the canvas is supported along a series of separated parallel lines. In this way there are formed beneath the canvas and between the adjacent corrugations longitudinal passageways 45, 45, which extend the entire length of the drum.

Each of the cross blocks 37, 37, is provided with a groove 46, which extends transversely of the filter pan or section. An opening 47 establishes communication between the groove and the opening 27 leading from or to one of the spigots 28. Apertures 48, 48, are provided in the metal sheets 40 and 42, at the bottoms of the corrugations, and establish communication between the groove 46 and the grooves or passageways 45, 45. In this way, therefore, unbroken communication is established when the spigots are open, between the conduit 21, and the grooves or passageways 45, 45.

When all of the filter pans or sections are in place on the framework, they may be secured together by means of bolts 49, 49, extending transversely through each pair of adjacent bars 34, 34.

50 represents a framework at one end of the machine which may be conveniently mounted directly upon the angle iron 4 on the top of the tank section 3. This framework comprises preferably two I-beams 51 and 52, which extend at right angles to the main shaft. Mounted upon these I-beams are other smaller I-beams 53 and 54, which project within the drum and carry tie-plates 55.

56 is a bracket secured to the upper tie-plate 55 and is provided at its upper end with a grooved slot concentric with the drum itself. In this slot a pin 57 is adjustably mounted and held in place by means of a nut. This pin is adapted to engage the arms of the spigot star wheel 32, as the drum is turned. By this engagement with the pin 37 the star wheels are turned through an angle of 90°.

58 represents a second bracket similar in function to the bracket 56 but differently shaped and secured to the lower of the two tie plates 55 connecting the I-beams 53 and 54. It is similarly provided with a curved slot concentric with the drum. In this slot there is mounted a pin 59 similar to the pin 57 and similarly held in adjusted position by means of a nut. This pin also by engagement with the spigot star wheels serves to rotate them through an angle of 90°.

It will be understood that the opposite end of the machine is provided with a similar frame work and with similar devices for operating the spigot star wheels. These devices are indicated in Fig. 3, and a detail description of them will not be necessary.

At the forward side of the machine, that is, at the side toward which the drum rotates, there is mounted a trough 60, the bottom of which is inclined toward one end of the machine. This trough may be conveniently supported upon the I-beams 52 by means of frame structures such as are indicated by 61. The lower end of the trough may be connected with any suitable means such as a second trough 60$^a$, for carrying away the mixture which is received by the trough 60 in the manner to be hereinafter described.

Bearings 62 are mounted upon the frame parts 61 and for the purpose of supporting these bearings channel irons 63 may be provided.

64 represents a scraper or deflector plate which extends the entire length of the drum and which is provided at its forward edge with a flexible lip 65 which may preferably be formed of sheet rubber. This lip is adapted to engage with the filtering surface of the drum.

As shown in the drawings the plate 64 is mounted upon an I-beam 66, and this I-beam is provided at its ends with cylindrical trunnions 67 which are supported in the bearings 62. In this way the plate 64 is pivotally supported with its rubber lip in operative position. If desired, in order to provide a means for regulating the pressure of the rubber lip against the drum, an arm 68 may be secured to one of the trunnions 67, and upon the arm there may be mounted a slidable weight 69 provided with means such as a set-screw 70 for securing it in adjusted position on the arm.

Above the drum and directly back of the scraper or deflector before described there are mounted a plurality of pipes 71, 71, which extend the entire length of the drum. In the drawings I have indicated three such pipes though the actual number may be varied in accordance with the conditions under which the machine is to operate. The pipes may be mounted upon suitable frame structures such as are indicated by 72 and which in turn are supported from the I-beams 52, 52. Each of the pipes is provided in its lower side and throughout its length with a series of small apertures. The pipes are connected at one end with a manifold 73 through which a suitable liquid, such as water, or a chemically active solvent, may be introduced into the pipes and from them forced on to the surface of the drum.

If desired a supplementary pipe 74 may be provided below and in front of the edge of the scraper. This pipe may be similar to the pipes 71, 71, and may be similarly connected with the manifold 73. If the supplementary pipe 74 is used, I prefer to provide below it a second scraper or deflector 64ᵃ similar to the scraper 64 and similarly provided with a flexible lip 65ᵃ. The scraper 64ᵃ may be pivotally mounted as shown in the drawings and may be provided with an arm 68ᵃ upon which there is a slidable weight 69ᵃ held in adjusted position by means of a set screw 70ᵃ.

The operation of my improved dehydrater is as follows, it being assumed for purposes of illustration that it is used to perform one step in the treatment of ore by the potassium cyanid process: Let it be considered that a mass of pulverized ore has been intimately mixed with and thoroughly subjected to the action of a solution of solvent. After this step of the process has been completed the pulp or mixture of ore and solvent solution is led into the tank 1 through the pipe 2. The inflow of pulp should be so regulated as to keep the level of the mixture near the top of the tank and at the same time prevent overflow. The drum is continuously rotated in the direction of the arrows on the various figures of the drawings by means of the worm wheel 8, and the worm 9. The speed of rotation may, of course, be varied in accordance with considerations as those depending upon the character of the pulp to be treated. However if a drum of, say, 18 feet in diameter is used, I at present consider that a rotative speed of one revolution in ten minutes would insure a satisfactory operation of the machine under average conditions.

The shaft section at one end of the machine, for instance the left hand end, is connected by means of a pipe such as 17 with a suitable vacuum pump. By this means a constant vacuum is maintained within the left hand shaft section, within the spokes 20 connected to it and within the left hand annular conduit 21. Similarly, the shaft section at the other end of the machine is connected by means of a pipe such as 18 with a device for supplying air under pressure. In this way a constant pressure is maintained within the right-hand section, within the spokes 20 connected to it, and within the right-hand annular conduit 21.

Referring to Fig. 5, it will be observed that the spigots 28 in the left-hand conduit 21 are in open position with the exception of those which are situated between the pins 57 and 59. Therefore direct communication is established through the spigots between the conduit 21 and the passageways or grooves 45 immediately beneath the canvas filter surface, a vacuum being thus formed in the grooves or passageways. The liquid constituent of the pulp in which the drum is partly submerged is drawn inward through the filtering medium and the solid constituents of the pulp are collected upon the outer surface of the filtering medium. The liquid thus drawn out from the pulp mass will pass from the grooves 45 through the various passageways which have been heretofore described and out through the pipe 17 to be afterward treated in any suitable manner.

It will be understood that the corresponding spigots at the other or right-hand end of the machine, i. e. all of them except those between the pins 57 and 59, are in closed position, communication being thus cut off between the grooves or passageways 45 and the air pressure device. When, by the constant rotation of the drum, the spigot star wheels are brought successively into engagement with the pins 57 located at opposite ends of the machine those spigots at the left-hand end of the machine are moved from open to closed positions and those at the right-hand end are moved from closed to open positions. Similarly, when by the continued movement of the drum the spigot star wheels are brought into engagement with the pins 59 at the opposite ends of the machine, those at the left-hand end of the machine are moved from closed to open positions and those at the right-hand end are moved from open to closed positions. By means of this mechanism, therefore, that part of the filtering medium which is at any time positioned between the planes of the pins 57 and 59 is subjected to outward air pressure, while the other part of the filtering medium not so positioned is at the same time subjected to suction or inward air pressure. The suction serves to draw the moisture from the pulp and effect the filtering operation, while the pressure serves to loosen the solid material from the surface of the filtering medium. The continued action of the vacuum after the filtering medium emerges from the pulp serves to further dehydrate and dry the solid matter which has collected upon the medium.

It will be observed that the points at which the respective sections of the drum are connected with or disconnected from either the vacuum means or the pressure means may be adjusted at will within certain relatively small limits. This may be done by changing the positions of the pins 57 and 59. For instance, if desired, the vacuum may be shut off a moment before the pressure is connected, or if desired for any reason both may be connected simultaneously for a short interval.

The scraper 64, with the rubber lip 65, serves to remove the solid matter from the surface of the drum. The action of the scraper is greatly facilitated by means of the jets or sprays of liquid which are forced out from the pipes 71, 71. These jets or sprays may be forcible enough to entirely break up the layer of solid matter which has collected and to wash it down the surface of the drum and down the surface of the scraper into the trough 60 through which it may be conveyed to other parts of the plant for further treatment. The pressure of the rubber lip 65 against the drum may be regulated by means of the slidable weight 69, so that the scraper will act effectively without at the same time subjecting the rubber lip and canvas to undue wear.

The pipe 74, if used, serves to break up and loosen any solid matter which may have passed beneath the scraper.

It will be understood that during the intermediate stages of the treatment of ore by the cyanid process the purpose of dehydrating the pulp is to remove from it the solution which has become thoroughly saturated with dissolved values. In many cases it is desirable after this saturated solution has been removed to again subject the ore to the action of fresh solvent. This mixture of the ore with fresh solvent may be very advantageously effected by introducing the solvent into the pipes 71, 71, and utilizing it in the form of jets or sprays to loosen and remove the material from the drum. When this is done the mixture from the trough 60 may be conducted directly to apparatus, such as agitating tanks for the dissolving of further values from the ore.

I do not claim as a part of my present invention the process referred to, as this is covered by my copending application entitled Process of ore treatment, filed November 29, 1910, Serial No. 594703.

What I claim is:—

1. The combination in a dehydrating mechanism, of a tank, a drum framework mounted partly within the tank for rotation about a horizontal axis and comprising an annular conduit, a filtering medium fixedly mounted on the framework and forming a complete cylinder surrounding the conduit and closely adjacent thereto, means for maintaining partial vacuum in the conduit, ducts rigid with respect to the framework and serving to directly connect sectoral parts of the inner surface of the filtering medium independently of each other with the conduit, valves interposed respectively between the said sectoral parts of the filtering medium and the conduit, means operating continuously to remove accumulated material from the uppermost part thereof, and means for automatically causing each valve to be closed during that part of its revolution where it is adjacent the last aforesaid means and to be open during the remainder of said revolution.

2. The combination in a dehydrating mechanism, of a tank, a drum framework mounted partly within the tank for rotation about a horizontal axis and comprising two parallel annular conduits, a filtering medium fixedly mounted on the framework and forming a complete cylinder surrounding the conduits and closely adjacent thereto, means for maintaining partial vacuum in one conduit, means for maintaining pressure in the other conduit, ducts rigid with respect to the framework and serving to directly connect sectoral parts of the inner surface of the filtering medium independently of each other with vacuum conduit, other ducts rigid with respect to the framework and serving to directly connect the said sectoral parts independently of each other with the pressure conduit, valves interposed respectively between the said sectoral parts of the filtering medium and the said vacuum conduit, other valves interposed respectively between the said sectoral parts and the said pressure conduit, means for automatically causing each of the first said valves to be open during the lower part of each revolution and closed during the upper part, means operating continuously to remove accumulated material from the uppermost part thereof, and means for automatically causing each valve to be closed during that part of its revolution where it is adjacent the last aforesaid means and to be open during the remainder of said revolution.

3. The combination in a dehydrating mechanism, of a tank, a drum framework mounted partly within the tank for rotation about a horizontal axis and comprising an annular conduit, a filtering medium fixed with respect to the framework and forming a complete cylinder surrounding the conduit and closely adjacent thereto, the said medium being made up of a plurality of separated sectoral sections, a plurality of frames for the said sections respectively, the said frames being normally rigidly but detachably connected to the drum framework, means for maintaining a partial vacuum in the conduit, ducts rigid with respect to the framework and serving to directly connect the said sections of the filtering medium independently of each other with the conduit, valves interposed respectively between the said sections of the filtering medium and the conduit, means operating continuously to remove accumulated material from the uppermost part thereof, and means for automatically causing each valve to be closed during that part of its revolution where it is adjacent the last aforesaid means and to be open during the remainder of said revolution.

4. The combination in a dehydrating mechanism, of a tank, a drum framework mounted partly within the tank for rotation about a horizontal axis, a filtering medium fixed with respect to the framework and forming a complete cylinder, the said medium being made up of a plurality of separable sectoral sections, a plurality of frames for the said sections respectively, normally rigidly but detachably connected to the drum framework and each having a set of grooves which extend longitudinally of the drum and over which the filtering medium is stretched, the said grooves being closed at their ends and separated from each other by imperforate walls, a vacuum means, ducts rigid with the drum framework and each serving to directly connect the grooves of one set with the vacuum means independently of the grooves of the other set, and valves located respectively in the said ducts.

5. The combination in a dehydrating mechanism, of a tank, a drum framework mounted partly within the tank for rotation about a horizontal axis and comprising an annular conduit, a filtering medium fixed with respect to the framework and forming a complete cylinder surrounding the conduit and closely adjacent thereto, medium supporting frame elements connected to the drum framework and having sets of grooves which extend longitudinally of the drum and over which the filtering medium is stretched, the said grooves being closed at their ends and separated from each other by imperforate walls, means for maintaining a partial vacuum in the conduit, ducts rigid with the drum framework and each serving to directly connect the grooves of one set with the conduit independently of the grooves of the other sets, and valves located respectively in the said ducts.

6. The combination in a dehydrating mechanism, of a tank, a drum framework mounted partly within the tank for rotation about a horizontal axis, a filtering medium fixed with respect to the framework and forming a complete cylinder, the said medium being made up of a plurality of sectoral sections, a plurality of frames for the said sections respectively, normally rigidly but detachably connected to the drum framework and each having as a component part thereof a sheet of metal corrugated longitudinally of the drum, the outer part of each corrugation being imperforate and the said filtering medium being stretched over and between the corrugations, means for closing the ends of the spaces between the corrugations, and means for causing a partial vacuum in the spaces between the corrugations and the filtering medium.

7. In a dehydrating mechanism, the combination of a tank, a drum structure mounted partly within the tank for rotation about a horizontal axis and comprising two annular conduits, each provided with spaced apertures in its outer peripheral wall, means for maintaining partial vacuum within one conduit, means for maintaining pressure within the other conduit, a plurality of independent filtering elements rigidly secured to the drum structure and coöperating to form a complete cylindrical surface, the said elements being provided with passageways having apertures adapted to register with the apertures in the peripheral walls of the conduits, valves adapted to close the apertures in the vacuum conduit, other valves adapted to close the aperture in the pressure conduit, means for automatically causing each of the first said valves to be open during the lower part of each revolution and closed during the upper part, means operating continuously to remove accumulated material from the uppermost part thereof, and means for automatically causing each valve to be closed during that part of its revolution where it is adjacent the last aforesaid means and to be open during the remainder of said revolution.

8. In a dehydrating mechanism, the combination of a tank, a drum structure mounted partly within the tank for rotation about a horizontal axis and comprising an axle having therein two chambers, two sets of hollow spokes, one set being connected with one axle chamber and the other set being connected with the other axle chamber, and two hollow annular rings, one connected with one set of hollow spokes and the other with the other set of hollow spokes, each ring being made up of a plurality of sections each of which at its center is secured to and in communication with one of the spokes, a plurality of independent filtering elements rigidly secured to the drum structure and coöperating to form a complete cylindrical surface, means for automatically establishing communication between each filtering element independently of the others and the two annular rings alternately as the drum structure is rotated, means for maintaining a vacuum within one axle chamber, one set of spokes and one annular ring, means for maintaining a pressure in the other axle chamber, the other set of spokes and the other annular ring, and means continuously engaging the cylindrical surface formed by the filtering elements at points along the upper part of its path to remove accumulated material.

9. In a dehydrating mechanism, the combination of a tank, a drum structure rotatably mounted partly within the tank and comprising an axle consisting of a central part and two end parts, each of which is provided with a chamber separated from the central part, two annular hollow rings, hollow spokes for establishing connection between each axle chamber and one of the rings, and radially inward extending partitions 15 within the axle chambers between the points of connections of the spokes, means for maintaining a vacuum within one axle chamber and one ring, means for maintaining a pressure within the other axle chamber and the other ring, a filtering device connected with the rings, and means for automatically connecting the filtering device alternately with the two rings.

10. In a dehydrating mechanism, the combination of a tank, a rotatable drum structure comprising two annular hollow rings, a plurality of filtering sections mounted to rotate with the hollow rings, means for maintaining a vacuum within one hollow ring, means for maintaining a pressure within the other hollow ring, means for automatically connecting each filtering section independently of the others alternately with the two hollow rings as the drum structure is rotated, and means for regulating the periods during which the filtering sections are connected with one or the other of the said rings.

11. In a dehydrating mechanism, the combination of a tank, a rotatable drum structure comprising two annular hollow rings, a plurality of filtering sections mounted to rotate with the hollow rings, means for maintaining a vacuum within one hollow ring, means for maintaining a pressure within the other hollow ring, means for automatically connecting each filtering section independently of the others alternately with the two hollow rings as the drum structure is rotated, and means for regulating the periods during which the filtering sections are connected with one or the other of the said rings, the said means comprising rotatable valves provided with radial arms for actuating the same, pins to engage with the arms, slotted brackets for supporting the pins, and devices for holding the pins in adjusted positions in the said slots.

12. In a dehydrating mechanism, the combination of a tank, a continuously moving filtering medium adapted to be submerged during a part of its movement in a body of pulp within the tank, means for removing moisture from the pulp and collecting the solid matter thereof upon the surface of the filtering medium, means for loosening and receiving the solid matter from the filtering medium comprising a broad apron-like deflector having a flexible edge adapted to engage the said medium, means for yieldably holding the deflector against the medium, and means for adjusting the holding means to regulate the pressure between the deflector and the medium.

13. In a dehydrating mechanism, the combination of a tank, a continuously moving filtering medium mounted to be submerged during a part of its movement in a mass of pulp within the tank, means for removing moisture from the pulp and collecting the solid matter thereof on the filtering medium, and means for loosening and receiving the solid matter from the filtering medium comprising a movably mounted deflector yieldingly engaging the medium, and devices for directing jets of liquid upon the medium simultaneously at points arranged along a plurality of separated lines parallel to and closely adjacent the said deflector to loosen the collected material and wash it down upon the said deflector.

14. In a dehydrating apparatus, the combination of a tank, a continually moving filtering medium arranged to be submerged during a part of its movement in a body of pulp within the tank, means for removing moisture from the pulp and collecting the solid matter thereof upon the surface of the filtering medium, means for removing the solid matter from the surface of the filtering medium comprising a deflector engaging the said medium as it is moved, a device behind the deflector for directing streams of liquid against the said medium, and a second deflector engaging the said medium as it is moved at points in advance of the first deflector, and a common means for receiving material from the said deflectors.

15. In a dehydrating apparatus, the combination of a tank, a continually moving filtering medium arranged to be submerged during a part of its movement in a body of pulp within the tank, means for removing moisture from the pulp and collecting the solid matter thereof upon the surface of the filtering medium, means for removing the solid matter from the surface of the filtering medium comprising a deflector engaging the said medium as it is moved, a device behind the deflector for directing streams of liquid against the said medium, a second device in advance of the deflector for also directing streams of liquid against the said medium, and a second deflector engaging the said medium as it is moved at points in advance of the first deflector and in advance of the second liquid directing device, and a common means for receiving material from the said deflectors.

In testimony whereof I affix my signature in presence of two witnesses.

CYRUS ROBINSON.

Witnesses:
H. J. G. MACKIE,
DAVID SCOTT.